United States Patent
Norton et al.

(10) Patent No.: US 11,757,646 B2
(45) Date of Patent: Sep. 12, 2023

(54) METHODS FOR GENERATING AN ENCRYPTED SIGNAL SIMULATION WITH A CRYPTOGRAPHIC INTERFACE CARD (GCIC) AND DEVICES THEREOF

(71) Applicant: Orolia Defense & Security LLC, Rochester, NY (US)

(72) Inventors: William Norton, Ankeny, IA (US); Tim Erbes, Ankeny, IA (US); Gabriel Johnson, Ankeny, IA (US)

(73) Assignee: OROLIA DEFENSE & SECURITY LLC, Rochester, NY (US)

(*) Notice: Subject to any disclaimer, the term of this patent is extended or adjusted under 35 U.S.C. 154(b) by 234 days.

(21) Appl. No.: 17/086,737

(22) Filed: Nov. 2, 2020

(65) Prior Publication Data
US 2022/0141023 A1 May 5, 2022

(51) Int. Cl.
*H04L 29/00* (2006.01)
*H04L 9/32* (2006.01)

(52) U.S. Cl.
CPC .......... *H04L 9/3234* (2013.01); *H04L 9/3263* (2013.01)

(58) Field of Classification Search
CPC ..... H04L 9/3234; H04L 9/3263; G06F 21/34; G01S 19/03
See application file for complete search history.

(56) References Cited

U.S. PATENT DOCUMENTS

| | | | |
|---|---|---|---|
| 7,357,309 B2 | 4/2008 | Ghosh et al. | |
| 9,159,179 B2 | 10/2015 | Hong | |
| 9,697,371 B1 | 7/2017 | Willden et al. | |
| 2013/0251150 A1* | 9/2013 | Chassagne | H04L 63/123 380/270 |
| 2017/0048215 A1* | 2/2017 | Straub | H04L 63/0823 |
| 2018/0034631 A1* | 2/2018 | Ries | G01S 19/14 |
| 2021/0342816 A1* | 11/2021 | Benkreira | G06Q 20/3263 |

FOREIGN PATENT DOCUMENTS

EP 2158717 B1 9/2017

OTHER PUBLICATIONS

Anonymous: "GPS and GNSS Satellite Simulators—GSG 5/6 Series I Oralia", Sep. 30, 2020 (Sep. 30, 2020), pp. 1-8, XP055896667, Retrieved from the Internet: URL:https://web.archive.org/web/20200930160646/https://www.orolia.com/products/gnss-simulation/gpsgnss-simulators Mar. 1, 2022] [retrieved on Mar. 1, 2022].

* cited by examiner

*Primary Examiner* — Ghazal B Shehni
(74) *Attorney, Agent, or Firm* — Troutman Pepper Hamilton Sanders LLP (Rochester)

(57) ABSTRACT

A method, non-transitory computer readable medium, and device that transmits a cryptographic variable input to a detachably coupled smart card. Execution of at least one of protected cryptographic algorithm operation by the smart card which requires the cryptographic variable input and a cryptographic constant input stored on the smart card to generate one or more cryptographic products is requested. The one or more generated cryptographic products from the smart card are received. An encrypted signal simulation based on execution of a simulator using the received one or more generated cryptographic products is generated and is output.

18 Claims, 6 Drawing Sheets

METHODS FOR GENERATING AN ENCRYPTED SIGNAL SIMULATION WITH A CRYPTOGRAPHIC INTERFACE CARD (GCIC) AND DEVICES THEREOF

FIELD

This technology relates to methods for generating an encrypted signal simulation with a cryptographic interface card and devices thereof.

BACKGROUND

A Global Navigation Satellite System (GNSS) simulator needs certain information in order to properly generate encrypted GNSS codes. This information is a product of combining certain protected cryptographic algorithms (PCA) and multiple secrets comprising cryptographic constant input (CCI) data and cryptographic variable input (CVI) data. Some specific GNSS simulations cannot be done without these algorithms being performed on these secrets.

These algorithms are typically implemented by programs—also known as applets or apps. The program data itself is often called a binary. Typically, all of the programs and data necessary to run simulations are loaded onto the simulator itself, which is largely a standard computer.

Unfortunately, this is problematic because standard computers used as simulators are vulnerable to an innumerable set of security flaws. One such vulnerability inherent to these computers is the ease by which a bad actor can copy data and programs off of these computers, such as by writing proprietary data to a DVD or USB drive or by printing this proprietary data onto paper. Additionally, the programs in these computers can be easily de-compiled to determine the algorithms within.

SUMMARY

A method for securely generating an encrypted signal simulation includes transmitting, by a simulator computing device, a cryptographic variable input to a detachably coupled smart card. Execution of at least one of protected cryptographic algorithm operation by the smart card which requires the cryptographic variable input and a cryptographic constant input stored on the smart card to generate one or more cryptographic products is requested, by the simulator computing device. The one or more generated cryptographic products from the smart card are received, by the simulator computing device. An encrypted signal simulation based on execution of a simulator using the received one or more generated cryptographic products is generated, by the simulator computing device, and is output.

A non-transitory computer readable medium having stored thereon instructions comprising executable code which when executed by a processor, causes the processor to transmit a cryptographic variable input to a detachably coupled smart card. Execution of at least one of protected cryptographic algorithm operation by the smart card which requires the cryptographic variable input and a cryptographic constant input stored on the smart card to generate one or more cryptographic products is requested, by the simulator computing device. The one or more generated cryptographic products from the smart card are received, by the simulator computing device. An encrypted signal simulation based on execution of a simulator using the received one or more generated cryptographic products is generated, by the simulator computing device and is output.

A simulator computing device comprising a memory coupled to a processor which is configured to be capable of executing programmed instructions stored in the memory to transmit a cryptographic variable input to a detachably coupled smart card. Execution of at least one of protected cryptographic algorithm operation by the smart card which requires the cryptographic variable input and a cryptographic constant input stored on the smart card to generate one or more cryptographic products is requested. The one or more generated cryptographic products from the smart card are received. An encrypted signal simulation based on execution of a simulator using the received one or more generated cryptographic products is generated and is output.

This technology provides a number of advantages including providing methods and devices for securely generating an encrypted GNSS simulation with a GNSS cryptographic interface card (GCIC). With examples of this technology, the GCIC provides a solution to security concerns relating to providing necessary protection of protected cryptographic algorithms (PCA) and secrets comprising cryptographic constant input (CCI) data and cryptographic variable input (CVI) data. In particular, with examples of this technology, the GNSS simulator computing device is able to get the necessary cryptographic product (CP) data, while mitigating these prior security flaws by physically removing at least a portion of the protected cryptographic algorithms (PCA) and secrets comprising cryptographic constant input (CCI) data and cryptographic variable input (CVI) data from the GNSS simulator computing device and performing the computations on the GCIC or other secure smart device.

DETAILED DESCRIPTION

Figure 1:
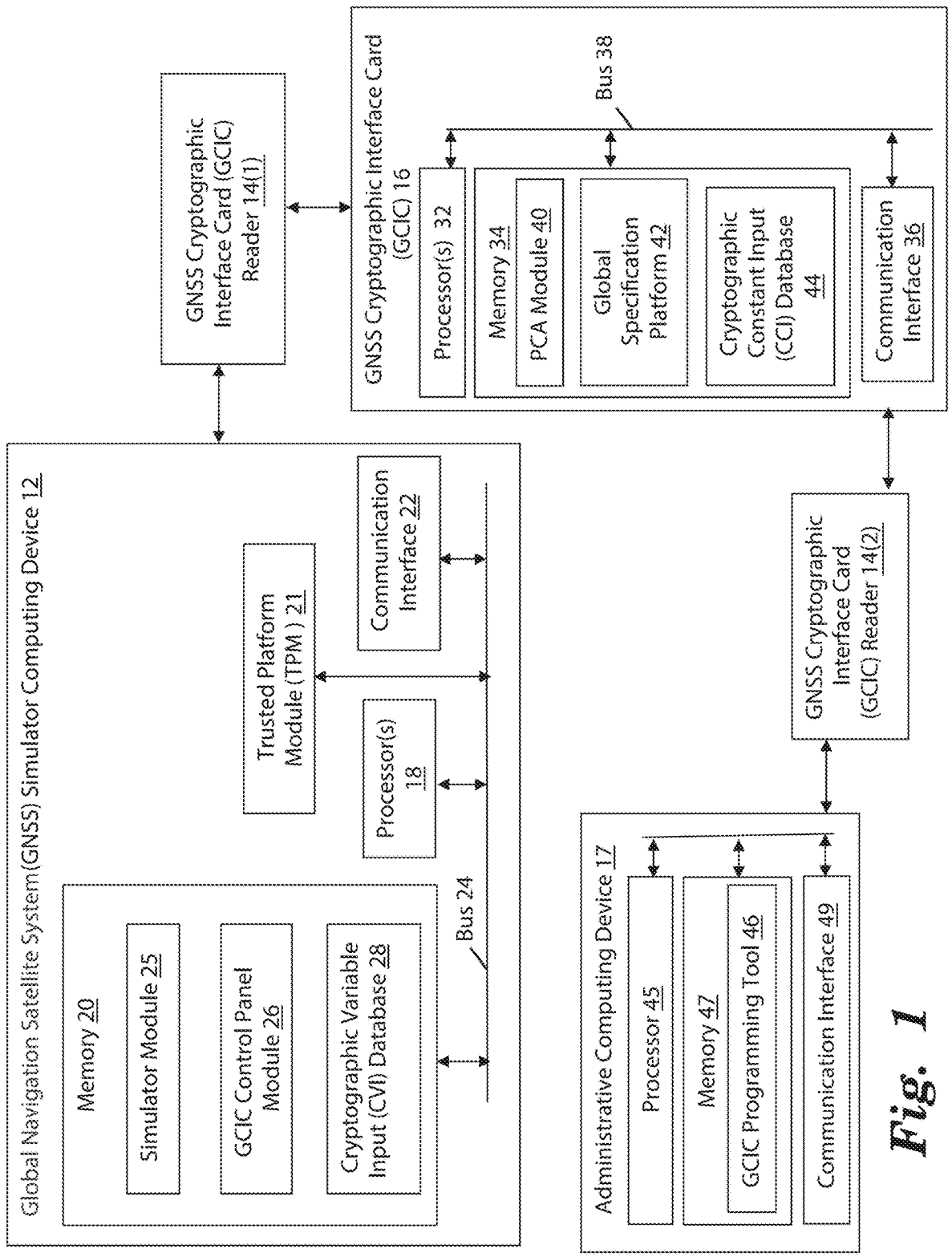
FIG. 1 is a block diagram of an example of a system with an example of a Global Navigation Satellite System (GNSS) simulator computing device with a GNSS Cryptographic Interface Card (GCIC) reader and a GNSS Cryptographic Interface Card (GCIC)

An example of a system 10 with an exemplary GNSS simulator computing device 12 with GNSS Cryptographic Interface Card (GCIC) readers 14(1)-14(2), an exemplary GNSS Cryptographic Interface Card (GCIC) 16, and an administrative computing device 17 is illustrated in FIG. 1, although the system may have other types and/or other numbers of systems, devices, components or other elements in other configurations. This technology provides a number of advantages including providing methods and devices for securely generating an encrypted GNSS simulation with a GNSS cryptographic interface card.

Referring more specifically to FIG. 1, the GNSS simulator computing device 12 in this example includes at least one processor 18, memory 20, and a communication interface 22 which are coupled together by a bus or other communication link 24, although the GNSS simulator computing device 12 can include other types and/or numbers of elements in other configurations. In this example, the GNSS simulator computing device 12 is a GNSS simulator that is able to generate RF signals that comprise a simulated GNSS signal or other navigation or other positioning signal which may be output, for example to a GPS receiver or other system, although the GNSS simulator computing device 12 may execute other types and/or numbers of operations.

The processor 18 of the GNSS simulator computing device 12 may execute programmed instructions stored in the memory 20 for the any number of the functions or other operations illustrated and described by way of the examples herein. The processor 18 of the GNSS simulator computing device 12 may include one or more CPUs or other processors with one or more processing cores, for example, although other types of processor(s) can also be used.

The memory 20 of the GNSS simulator computing device 12 stores these programmed instructions and/or other data for one or more aspects of the present technology as illustrated and described herein, although some or all of the programmed instructions could be stored elsewhere. A variety of different types of memory storage devices, such as random access memory (RAM), read only memory (ROM), hard disk (HDD), solid state drives (SSD), flash memory, or other computer readable medium which is read from and written to by a magnetic, optical, or other reading and writing system that is coupled to the processor(s), can be used for the memory 20. In this example, the memory 20 of the GNSS simulator computing device 12 can store application(s) that can include executable instructions that, when executed by the user equipment computing device, cause the GNSS simulator computing device 12 to perform actions, such as simulating GNSS signals related to navigation or other positioning and to perform other actions illustrated and described by way of the examples herein with reference to FIGS. 2-6. The application(s) can be implemented as modules or components of other application(s). Further, the application(s) can be implemented as operating system extensions, modules, plugins, or the like.

The memory 20 includes a simulator module 25, a GCIC control panel (GCP) module 26, and a Cryptographic Variable Input (CVI) database 28, although the memory 20 may include other types and/or numbers of other modules, programmed instructions, or other data. In this example, the simulator module 25 comprises a programmed instructions for executing one or more GNSS or other signal simulations and herein is referred to as SDX. In this example, the GCP module 26 includes programmed instructions to interact with the GCIC 16 to generate RF or other signals that simulate a GNSS or other navigation or positioning signal by way for example only, as illustrated and described by way of the examples herein. In this example, the Cryptographic Variable Input (CVI) database 28 stores the cryptographic variable input (CVI) is which is loaded by an authorized user of the GNSS simulator computing device 12 immediately prior to a GNSS simulation, although the database could store other types of data or other information in other manners.

In this particular example, a trusted platform module (TPM) 21 is a cryptographically secure device that may include a processor, a communication interface and non-volatile (permanent) memory inside of it that is inaccessible to all other devices and users and is where the GNSS simulator computing device 12 stores the private key. The trusted platform module 21 may include programmed instructions for a digital signature algorithm that generates public and private key pairs and retains the private key which can be used to sign data and output a digital signature, although the trusted platform module 21 may perform other functions, such as those illustrated and described by way of the examples herein. In this example the TPM 21 is illustrated within the GNSS simulator computing device 12, although the TPM could be in other locations, such as external from the GNSS simulator computing device 12 by way of example.

The communication interface 22 of the GNSS simulator computing device 12 operatively couples and communicates between the GNSS simulator computing device 12 and the GNSS Cryptographic Interface Card (GCIC) Reader 14(1) and GNSS Cryptographic Interface Card (GCIC) 16, although other types of communication configurations can be used. By way of example only, the communication network(s) can include local area network(s) (LAN(s)) or wide area network(s) (WAN(s)), and/or wireless networks by way of example only, although other types and/or numbers of protocols and/or communication networks can be used.

Each of the GNSS Cryptographic Interface Card (GCIC) readers 14(1)-14(2) is an electronic reader device that is able to interact with GNSS Cryptographic Interface Card (GCIC) 16, although other types of reading devices or other systems may be used. In this example, each of the GCIC readers 14(1)-14(2) is configured to interact with and read from the GCIC 16 and provide the read data and other information to the signal simulation computing device 12 and the administrative computing device 17, respectively, as illustrated and described by way of the examples herein, although other configurations may be used. Additionally, in this particular example each of the GCIC readers 14(1)-14(2) is illustrated separately from the GNSS simulator computing device 12 and the administrative computing device 17, but in other examples could be incorporated in the GNSS simulator computing device 12 and/or in the administrative computing device 17, although other manners for the GNSS simulator computing device 12 and/or the administrative computing device 17 interacting with the GCIC 16 could be used.

In this example, the GNSS Cryptographic Interface Card (GCIC) 16 is a Javacard which is a smart card (also known as a chip card or integrated circuit card by way of example) that runs a version of the Java programming language tailored for microprocessors of smart card, although other types of cards or other devices may be used. The GCIC 12 in this example includes a processor 32, a memory 34, and a communication interface 36 which are coupled together by a bus or other communication link 38, although the GNSS simulator computing device 12 can include other types and/or numbers of elements in other configurations.

The processor 32 of the GCIC 16 may execute programmed instructions stored in the memory 34 for the any number of the functions or other operations illustrated and described by way of the examples herein. The processor 32 of the GCIC 16 may include one or more CPUs or other processors with one or more processing cores, for example, although other types of processor(s) can also be used.

The memory 34 of the GCIC 16 stores programmed instructions and/or other data for one or more aspects of the present technology as illustrated and described herein, although some or all of the programmed instructions could be stored elsewhere. A variety of different types of memory storage devices, such as random access memory (RAM), read only memory (ROM), hard disk (HDD), solid state drives (SSD), flash memory, or other computer readable medium which is read from and written to by a magnetic, optical, or other reading and writing system that is coupled to the processor(s), can be used for the memory 34. In this example, the memory 34 of the GCIC 16 can store application(s) that can include executable instructions that, when executed by the user equipment computing device, cause the GCIC 16 to perform actions, such as and to perform other actions illustrated and described by way of the examples herein with reference to FIGS. 1-6. The application(s) can be implemented as modules or components of other application(s). Further, the application(s) can be implemented as operating system extensions, modules, plugins, or the like.

The memory 34 includes a Protected Cryptographic Algorithm (PCA) module 40, a Global Platform Specification 42, and a Cryptographic Constant Input (CCI) database 44, although the memory 34 may include other types and/or numbers of other modules, programmed instructions, or other data. In this particular example, the Protected Cryptographic Algorithm (PCA) module 40 (also referred to herein as a Talen-X applet to securely hide and execute a PCA and a Cryptographic Constant Input (CCI) as illustrated and described by way of the examples herein. Additionally, in this example the Global Platform Specification 42 comprises programmed instructions and data for security requirements and features as well as lifecycle states for the GCIC 16 as illustrated and described by way of the examples herein. In this example the Global Platform Specification 42 is implemented by an operating system stored on and running on the GCIC 16. Further, in this example the memory 34 the Cryptographic Constant Input (CCI) database 44 stores the cryptographic constant input (CCI) is which is loaded during initialization and cannot be read or removed. Once on the card, only the PCA module 40 with the protected cryptographic algorithms (also referred to as TXCAP herein) has access to the cryptographic constant input (CCI).

The communication interface 38 of the GCIC 16 operatively couples and communicates between the GCIC 16 and the GNSS Cryptographic Interface Card (GCIC) Reader 14(1) which is coupled to the GNSS simulator computing device 12 and with the GCIC Reader 14(2) which is coupled to the administrative computing device 17 in this example, although other types of communication configurations can be used. By way of example only, the communication network(s) can include local area network(s) (LAN(s)) or wide area network(s) (WAN(s)), and/or wireless networks by way of example only, although other types and/or numbers of protocols and/or communication networks can be used.

In this example, the administrative computing device 17 is any type of computing device that is authorized to interface with the GCIC 16 for initialization, although the administrative computing device 17 may execute other types and/or numbers of other operations and other types of authorized computing devices may be used. In this example, the administrative computing device 17 includes a processor 45, a memory 47, a communication interface 49, and a GCIC card reader which are coupled together by a bus or other communication link, although other numbers and/or types of network devices could be used. Additionally, in this example, the administrative computing device 17 has a GCIC programming tool 46 in the memory 47 comprising programmed instructions which may be executed to initialize the GCIC 16 as illustrated and described by way of the examples herein, such as in FIG. 4 and may store other data, such as an Digital Signature Algorithm (DSA) public key as described in greater detail herein. The administrative computing device 17 may further include a display device, such as a display screen or touchscreen, and/or an input device, such as a keyboard, for example.

Although the GNSS simulator computing device 12, the GCIC readers 14(1)-14(2), the GCIC 16, and the administrative computing device 17 are illustrated and described in the illustrative examples herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

Portions of all of the examples of the technology illustrated and described herein may also be embodied as one or more non-transitory computer readable media having instructions stored thereon for one or more aspects of the present technology. The instructions in some examples include executable code that, when executed by the processor of the user equipment computing device, cause the processor to carry out steps necessary to implement the methods of the examples of this technology that are illustrated and described herein.

Figure 2:
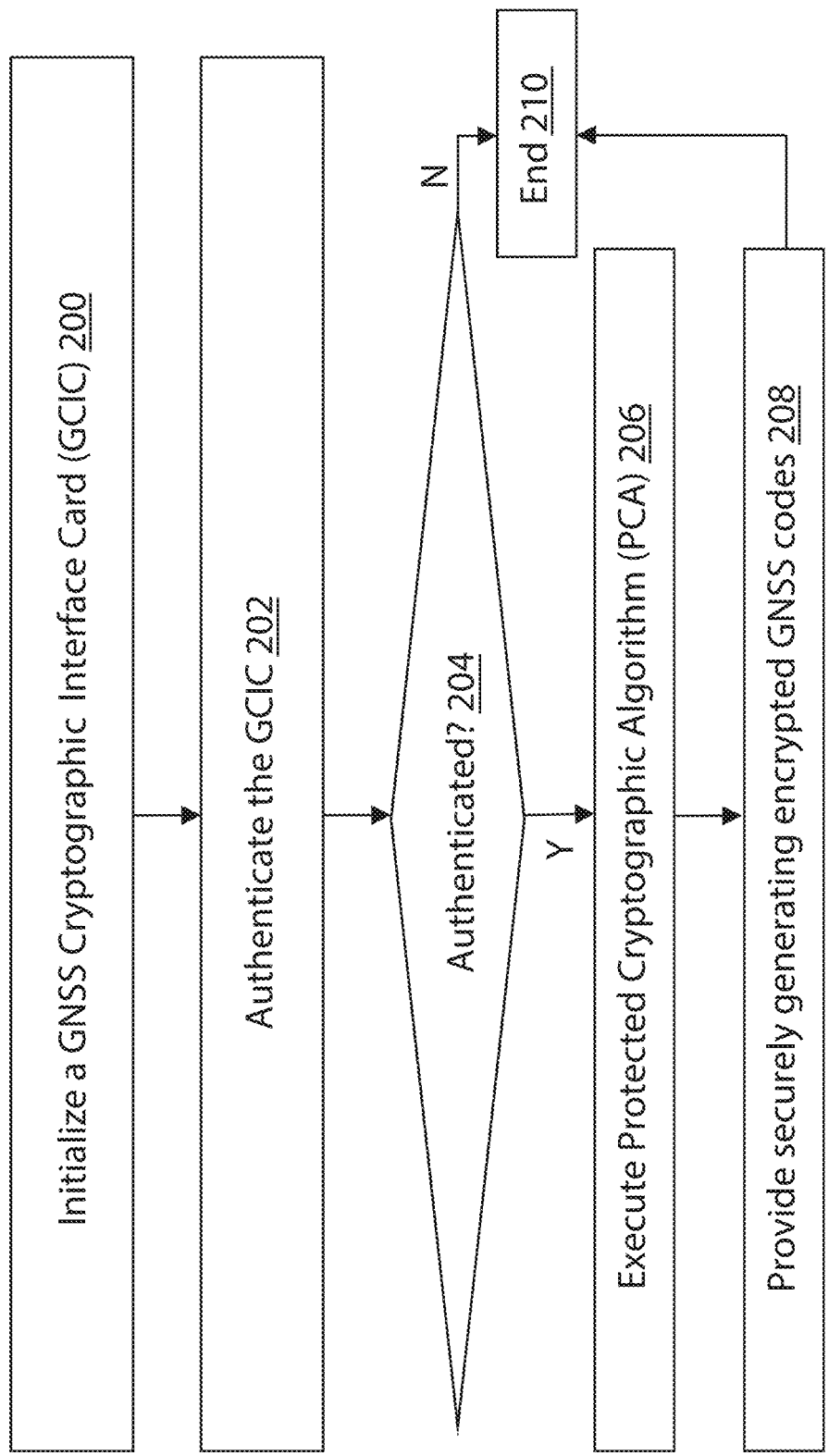
FIG. 2 is a flowchart of an example of method for initializing and generating an encrypted GNSS simulation with an exemplary GNSS cryptographic interface card and an exemplary GNSS simulator computing device.
Figure 3:
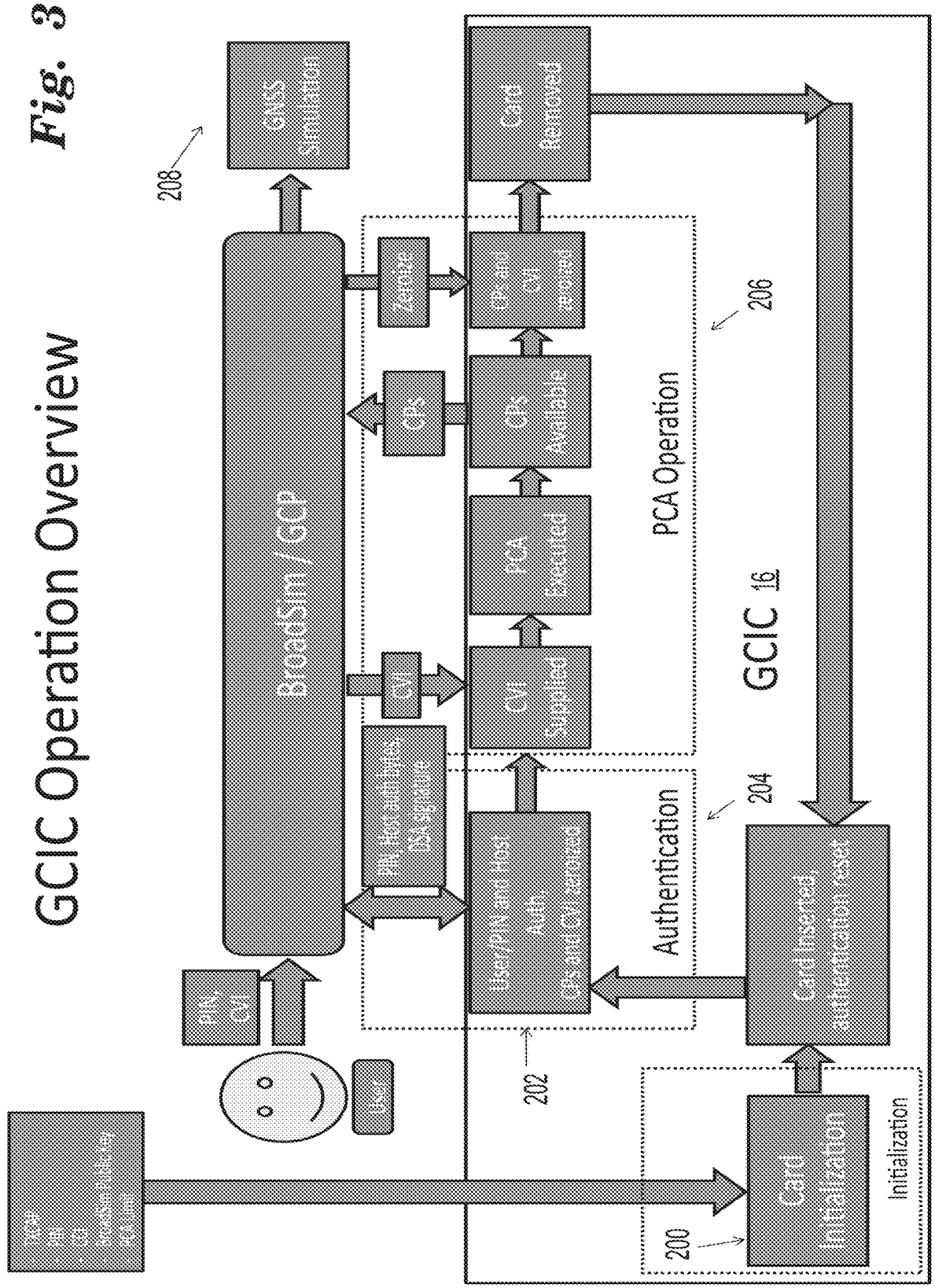
FIG. 3 is a functional block diagram of the example of the method for initializing and generating an encrypted GNSS simulation with the exemplary GNSS cryptographic interface card and the exemplary GNSS simulator computing device.

An exemplary method for initializing and generating an encrypted GNSS simulation with the GCIC 16 and the GNSS simulator computing device 12 will now be described with reference to FIGS. 1-6. Referring to FIGS. 2-3, in step 200 the GCIC 16 may be initialized by the administrative computing device 17, which in this example is an authorized computer for initialization.

Figure 4:
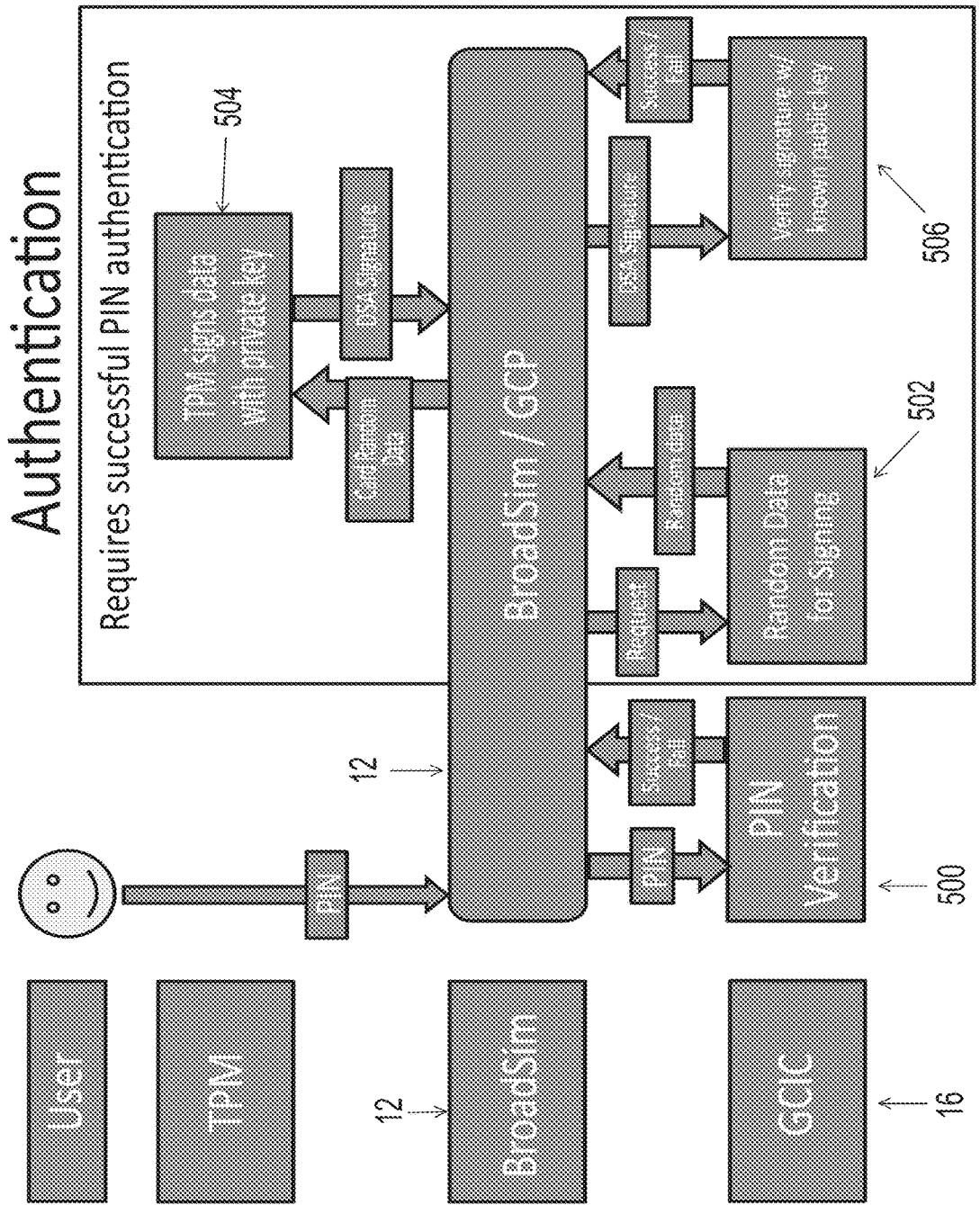
FIG. 4 is a functional block diagram an example of a method for initialization of the exemplary GNSS cryptographic interface card and of the exemplary GNSS simulator computing device.

Referring more specifically referring to FIG. 4, a functional block diagram of an example of a method for initialization of the GCIC 16 and the GNSS simulator computing device 12 is illustrated. In this example, at step 400 the GCIC programming tool 46 executing on the administrative computing device 17 receives during an initialization process an input or other download of: a personal identification number (PIN) for user authentication; an Digital Signature Algorithm (DSA) public key for authentication with a specific simulator (in this example the public key of a keypair is provided by the GNSS simulator computing device 12 which stores the private key of the keypair); a value for maximum number of PCA operations; and a protected secret for use in PCA operations, although other types of data and/or other information may be loaded on the GCIC 16. In this particular example, the administrative computing device 17 can only execute the initialization process with the GCIC programming tool 46 on the GCIC 16 once. Additionally in this example, the GCIC 16 is configured so that the PIN, host public key, and the protected secret for use in PCA operations cannot be read off the GCIC 16 after initialization and a number of PCA operations remaining can be read, but the initial value for the maximum number of PCA operations cannot.

In step 402 the GCIC programming tool 46 of the administrative computing device 17 may initiate authentication and other initialization process via the GCIC reader 14(2) with the GCIC 16.

In step 404, the GCIC Programming Tool 46 executing on the administrative computing device 17 may load the PCA module 40 (also referred to herein as TXCAP) with one or more protected cryptographic algorithms into the operating system of the GCIC 16, although in other examples other types and/or numbers of other programmed instructions and/or other data may be loaded into the GCIC 16.

Additionally during this step, the GCIC 16 may implement a specification which outlines security processes that ensure the security of the application data within, such as the standard known as the Global Platform Specification. Further during this step or at other times, the GNSS simulator computing device 12 may be loaded with the requisite software to perform the required GNSS or other simulations including in this example the simulation module 25 in memory 20 and the GCIC control panel module 26 to enable an authorized user of the GNSS simulator computing device 12 to communicate and interact with the GCIC 16, although the GNSS simulator computing device 12 can be initialized at different time and in a different manner.

In step 406, the GCIC Programming Tool 46 executing on the administrative computing device 17 may transmit the setup parameters to the GCIC 16 and the PCA module 40 is initialized in the GCIC 16. In this example, the setup parameters comprise: a personal identification number (PIN) for user authentication; an Digital Signature Algorithm (DSA) public key for authentication with a specific simulator (in this example the public key is provided by the GNSS simulator computing device 12); a value for maximum number of PCA operations; and a protected secret for use in PCA operations, although other types of data and/or other information may be loaded on the GCIC 16.

In step 408, the GCIC Programming Tool 46 executing on the administrative computing device 17 may generate a report on loading the GCIC 16, such as PDF report although other types and formats of reports can be provided.

Referring back to FIGS. 2 and 3, in step 202 the GCIC 16 may be authenticated by the GNSS simulator computing device 12. In this example, this authentication procedure ensures that a specific GCIC 16 can only be used with a specific GNSS simulator computing device 12. The GCIC 16 can never be used with two different computers or simulators.

Figure 5:
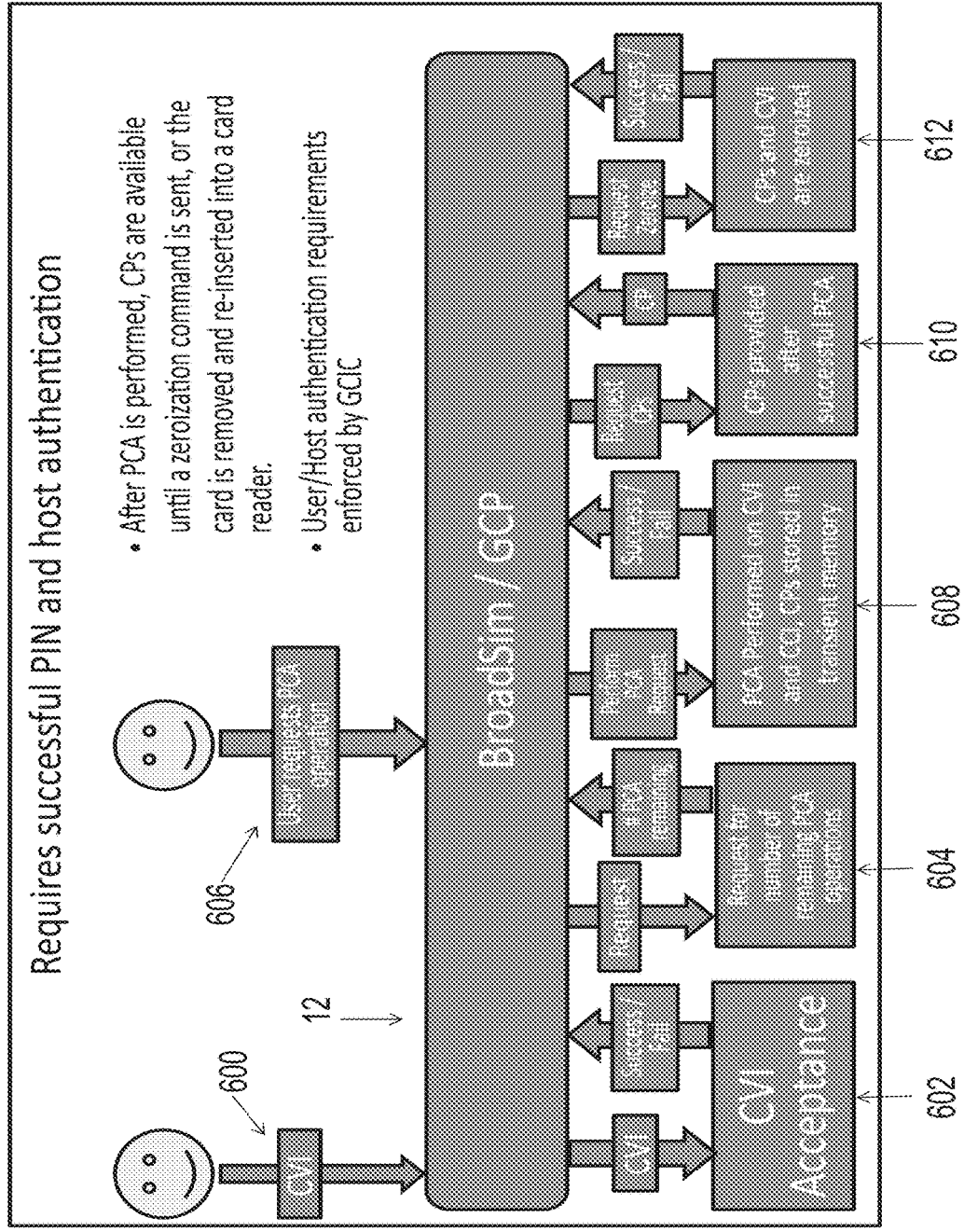
FIG. 5 is a functional block diagram of an example of a method for authentication the exemplary GNSS cryptographic interface card with the exemplary GNSS simulator computing device.
Figure 5:
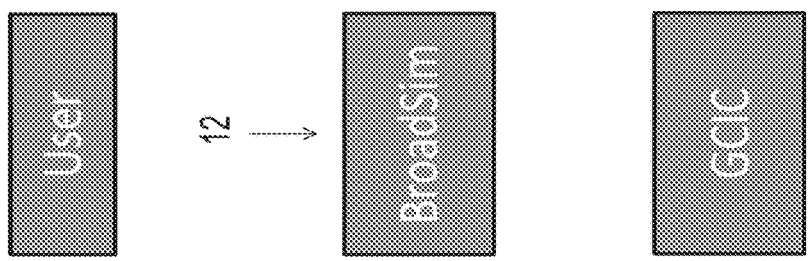

Referring more specifically referring to FIG. 5, a functional block diagram of an example of a method for authentication of the GCIC 16 with the GNSS simulator computing device 12 is illustrated. In step 500, a user enters a PIN using the GNSS simulator computing device 12 which is transmitted to the GCIC 16. The GCIC 16 verifies if the received PIN matches the stored PIN and transmits an indication of either success or failure to the GNSS simulator computing device 12. In this example, if the wrong PIN is entered three times consecutively, regardless of power cycling, the GCIC 16 is programmed to lock, although other numbers of attempts can be used and other initial authentication may be required, such as two factor authentication by way of example only.

In step 502, if the PIN was successfully entered and verified, then the GCP module 26 of the GNSS simulator computing device 12 and the GCIC 16 continue with the authentication procedure. In this example, the GCP module 26 of the GNSS simulator computing device 12 requests random data from the GCIC 16. In response to this request, the GCIC 16 generates or otherwise obtains and provides random data to the GCP module 26 of the GNSS simulator computing device 12.

In step 504, in response to receiving the random data, the GCP module 26 of the GNSS simulator computing device 12 commands the TPM 21 to digitally sign the GCIC-provided random data using the Digital Signature Algorithm (DSA) private key corresponding to a public key which is loaded onto the GCIC 16 in initialization step 200, although other types of security algorithms could be used. This type of digital signature algorithm can be used to verify the authenticity of data or users. A mathematically-intertwined pair of asymmetric keys (a private and public keypair) may be generated using random inputs by the GNSS simulator computing device 12. In this keypair, one is a public key of a keypair for a particular GCIC 16 and the other is a private key for the keypair for the GNSS simulator computing device 12 which in this example are generated during an initialization or pre-sale process. Data can be "signed" with a private key using a DSA by the GNSS simulator computing device 12. This "signature" is a fixed-length (length depending on which DSA is used) set of data that seems random, but is mathematically related to the keypair and the data that was "signed." Data can be verified using the public key, the signature, and the data so that the GNSS simulator computing device 12 can be cryptographically coupled or linked with one particular GCIC 16. In this example, the mathematically-related algorithm is done using these three inputs. With this exemplary process, private keys cannot be deduced from public keys and signatures. These mathematical operations are one-way. For a given set of data (such as a PDF, or random sequence), only one signature can be generated using a private key. Accordingly, bad actors cannot create a signature which passes the verification process which uses a public key without the private key. Accordingly, referring back to step 504 once the signature is generated, the GCP module 26 of the GNSS simulator computing device 12 sends signature to the GCIC 16. In step 506, in response to the receipt of the signature, the GCIC 16 determines if the signature is verified using the public key the GCIC 16 was initialized using the process described above. Based on this determination, the GCIC 16 transmits an indication of either success or failure to the GNSS simulator computing device 12.

Accordingly, this example illustrates how a GCIC 16 can be keyed to a particular GNSS simulation device 12. The GCIC 16 could not be used with any other simulator because the corresponding private key is locked away in the TPM 21 of the corresponding GNSS simulator computing device 12 and the private key in any other simulator would not match the public key in the GCIC 16.

Referring back to FIGS. 2 and 3, in step 204 the GCIC 16 determines whether the GNSS simulator computing device 12 is authenticated based on the exemplary process described in step 202 in this example. If the GCIC 16 determines the GNSS simulator computing device 12 is authenticated, then the Yes branch is taken to step 206 where the GCIC 16 executes one or more protected cryptographic algorithm from PCA module 40 for generating an encrypted GNSS simulation with the GNSS simulator computing device 12.

Figure 6:
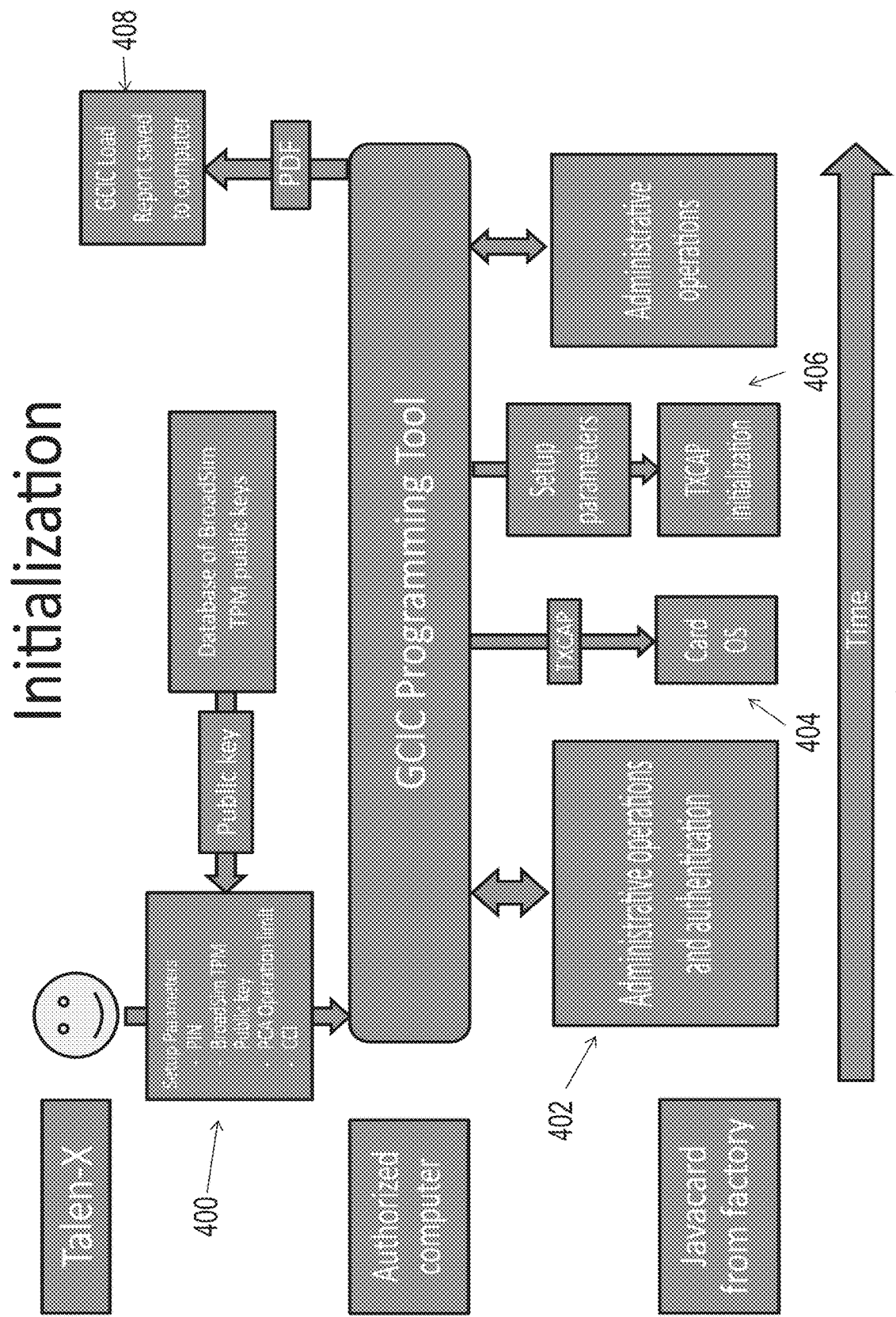
FIG. 6 is a functional block diagram of an example of a method for executing one or more protected cryptographic algorithms to generate a GNSS simulation with the exemplary GNSS cryptographic interface card and with the exemplary GNSS simulator computing device.

Referring more specifically referring to FIG. 6, a functional block diagram of an example of a method for executing one or more protected cryptographic algorithms to generate a GNSS simulation with the GCIC 16 and the GNSS simulator computing device 12 is illustrated. In step 600, a cryptographic variable input (CVI) is loaded or otherwise entered by an authorized user on the GNSS simulator computing device 12, although other manners for obtaining the CVI may be used.

In step 602, the CVI is transmitted by the GNSS simulator computing device 12 to the GCIC 16 which determines if the CVI is accepted based on one or more rules or other stored for CVI, such as a checksum operation or a designated length for the CVI by way of example only. Based on the determination, the GCIC 16 transmits either an indication of success or failure of the acceptance of the received CVI to the GNSS simulator computing device 12.

In step 604, the GNSS simulator computing device 12 transmits a request to the GCIC 16 regarding a remaining number of PCA operations which may be executed by the GCIC 16. As discussed earlier, during initialization for security reasons the GCIC 16 is programmed with a maximum number of PCA operations which may be executed and also is programmed to track a number of remaining PCA operations which in some examples may be provided to authorized or otherwise authenticated users and computing devices. This limit on the number of PCA operations provides added security should both the GNSS simulator computing device 12 and GCIC 16 be stolen or accessed by a bad actor because the GCIC 16 has a limited use before a replacement must be obtained. In response to the request, in this example the GCIC 16 outputs a remaining number of PCA operations which may be executed to the GNSS simulator computing device 12.

In step 606, if a necessary number of PCA operations remain an authorized user at the GNSS simulator computing device 12 may transmit a request for execution of a PCA for a GNSS simulation to the GCIC 16.

In step 608, GCIC may receive the request to perform a PCA operation for a GNSS simulation. In response to that request, the GCIC 16 may execute a PCA using the PCA module 40 on the received cryptographic variable input (CVI) and the cryptographic constant input (CCI) stored in the CCI database to generate an output referred herein as the Cryptographic Product (CP) which is stored by the GCIC 16 in memory 34. Based on this execution, the GCIC 16 transmits and indication of either a success or failure with the execution of the PCA to generate the CP to the GNSS simulator computing device 12.

In step 610, if the execution of the PCA to generate the CP was indicated to be successful, then the GNSS simulator computing device 12 may transmit a request to the GCIC 16 to provide the CP to the GNSS simulator computing device 12. In response to the request, the GCIC 16 may retrieve the CP from memory 34 and transmit the CP to the GNSS simulator computing device 12. The GNSS simulator computing device 12 use the one or more received CPs to execute a GNSS or other simulation using the simulator program in the simulator module 25 in this example.

In step 612, in response to receiving the one or more CPs the GNSS simulator computing device 12 may transmit a zeroization command to the GCIC 16 to zeroize or otherwise erase the one or more CPs and CVI. In response to the zeroization command, the GCIC 16 will zeroize the CP and CVI and then transmit back an indication of a success or failure of the zeroization to the GNSS simulator computing device 12. In this example the GCIC 16 provides two levels of zeroization: Level 1 zeroizes CPs and CVI; and Level 2 zeroizes CPs, CVI, and CCI, although other numbers of levels may be established. Once a Level 2 zeroize is performed, the GCIC 16 is of no use as there is no way to re-load a CCI and the one or more PCAs in the PCA module 40 cannot be performed. In this example, the GCIC 16 performs a Level 1 zeroize prior to authentication procedures, which is required after every power-off. A Level 2 zeroize is performed automatically by the GCIC 16 when the number of PCA operations is reduced to zero, when an invalid PIN is entered a set number of times consecutively, or when requested by the user via GCP, although other factors could be used.

Additionally, with respect to zeroization, the GCIC 16 is designed to erase any stored CVI and CPs when the GCIC 16 is first communicated with after a power-off The GNSS simulator computing device 12 never knows anything regarding the one or more PCAs in the PCA module 40 nor the CCI in the CCI database 44. Additionally, it is impossible to copy the PCA module 40 (also referred to as the TXCAP herein), or the protected secret comprising the CCI in the CCI database 44 off of the GCIC 16. The smart card can only be used by authorized persons (who know the PIN) and only with the particular GNSS simulator computing device 12 with a private key of a keypair for the public key of that keypair with a particular GCIC 16 which is established during an initialization process or a presale process by way of example. The smart card can only be used by one authorized GNSS simulator computing device.

Referring back to FIGS. 2 and 3, in step 208 the GNSS simulator computing device 12 executes the simulation module 25 which uses the one or more CPs to the GNSS simulation which can be output to the desired device or system, such as a GNSS receiver by way of example only. Next after step 208 or if back in step 204 the GCIC 16 determines the GNSS simulator computing device 12 was not authenticated and the No branch was taken, then in step 210 this example of the method ends.

Accordingly, as illustrated and described by way of the examples herein this technology provides methods and devices for securely generating an encrypted GNSS simulation with a GNSS cryptographic interface card (GCIC). With examples of this technology, the GCIC provides a solution to security concerns relating to providing necessary protection of protected cryptographic algorithms (PCA) and secrets comprising cryptographic constant input (CCI) data and cryptographic variable input (CVI) data. In particular, with examples of this technology, GNSS simulator computing device is able to get the necessary cryptographic product (CP) data, while mitigating these prior security flaws by physically removing at least a portion of the protected cryptographic algorithms (PCA) and secrets comprising cryptographic constant input (CCI) data and cryptographic variable input (CVI) data from the GNSS simulator computing device and performing the computations on the GCIC or other secure smart device.

Having thus described the basic concept of the invention, it will be rather apparent to those skilled in the art that the foregoing detailed disclosure is intended to be presented by way of example only and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for securely generating an encrypted signal simulation, the method comprising:
   transmitting, by a simulator computing device, a cryptographic variable input to a detachably coupled smart card;
   requesting, by the simulator computing device, execution of at least one of protected cryptographic algorithm operation by the smart card which requires the cryptographic variable input and a cryptographic constant input stored on the smart card to generate one or more cryptographic products, wherein the cryptographic variable input and the cryptographic constant input are different from a public key and a private key of a keypair used in an authentication of the smart card with the simulator computing device;
   receiving, by the simulator computing device, the one or more generated cryptographic products from the smart card;
   generating, by the simulator computing device, an encrypted signal simulation based on execution of a simulator using the received one or more generated cryptographic products; and
   outputting, by the simulator computing device, the generated encrypted signal simulation.

2. The method as set forth in claim 1 further comprising:
   determining, by the simulator computing device, acceptance of the cryptographic variable input by the smart card based on at least one rule;
   wherein the requesting execution of at least one of protected cryptographic algorithm operation by the smart card is based on the determination indicating the acceptance of the cryptographic variable input.

3. The method as set forth in claim 1 further comprising:
   determining, by the simulator computing device, when the authentication to the smart card has been successfully completed based on a received personal identification number and based on cryptographic coupling of the smart card with the simulator computing device obtained by a signature verification process with the public key of the keypair with the smart card and the private key of the keypair with the simulator computing device;
   wherein the transmitting the cryptographic variable input is based on the determination of the successful authentication.

4. The method as set forth in claim 1 further comprising:
   determining, by the simulator computing device, from the smart card a number of remaining protected cryptographic algorithm operations on the smart card;
   wherein the requesting execution of at least one of protected cryptographic algorithm operation by the smart card is based on the determination indicating at least one of the protected cryptographic algorithm operations is remaining.

5. The method as set forth in claim 1 further comprising:
   determining, by the simulator computing device, from the smart card when the requested at least one of the protected cryptographic algorithm operations was successfully executed;
   wherein the receiving the one or more generated cryptographic products from the smart card is based on the determination indicating the successful execution of the requested at least one of the protected cryptographic algorithm operations.

6. The method as set forth in claim 1 further comprising:
   authenticating, with the simulator computing device, a personal identification number associated with a user;
   receiving, by the simulator computing device, the cryptographic variable input when the personal identification number associated with the user is authenticated.

7. A non-transitory computer readable medium having stored thereon instructions comprising executable code which when executed by a processor, causes the processor to:
   transmit a cryptographic variable input to a detachably coupled smart card;
   request execution of at least one of protected cryptographic algorithm operation by the smart card which requires the cryptographic variable input and a cryptographic constant input stored on the smart card to generate one or more cryptographic products, wherein the cryptographic variable input and the cryptographic constant input are different from a public key and a private key of a keypair used in an authentication of the smart card with the simulator computing device;
   receive the one or more generated cryptographic products from the smart card;
   generate an encrypted signal simulation based on execution of a simulator using the received one or more generated cryptographic products; and
   output the generated encrypted signal simulation.

8. The non-transitory computer readable medium as set forth in claim 7 wherein the executable code, when executed by the processor, further causes the processor to:
   determine acceptance of the cryptographic variable input by the smart card based on at least one rule;
   wherein the request execution of at least one of protected cryptographic algorithm operation by the smart card is based on the determination indicating the acceptance of the cryptographic variable input.

9. The non-transitory computer readable medium as set forth in claim 7 wherein the executable code, when executed by the processor, further causes the processor to:
   determine when the authentication to the smart card has been successfully completed based on a received personal identification number and based on cryptographic coupling of the smart card with the simulator computing device obtained by a signature verification process with the public key of the keypair with the smart card and the private key of the keypair with the simulator computing device;
   wherein the transmit the cryptographic variable input is based on the determination of the successful authentication.

10. The non-transitory computer readable medium as set forth in claim 7 wherein the executable code, when executed by the processor, further causes the processor to:
    determine from the smart card a number of remaining protected cryptographic algorithm operations on the smart card;
    wherein the request execution of at least one of protected cryptographic algorithm operation by the smart card is based on the determination indicating at least one of the protected cryptographic algorithm operations is remaining.

11. The non-transitory computer readable medium as set forth in claim 7 wherein the executable code, when executed by the processor, further causes the processor to:
    determine from the smart card when the requested at least one of the protected cryptographic algorithm operations was successfully executed;

wherein the receive the one or more generated cryptographic products from the smart card is based on the determination indicating the successful execution of the requested at least one of the protected cryptographic algorithm operations.

12. The non-transitory computer readable medium as set forth in claim 7 wherein the executable code, when executed by the processor, further causes the processor to:
authenticate a personal identification number associated with a user; and
receive the cryptographic variable input when the personal identification number associated with the user is authenticated.

13. A simulator computing device comprising:
a processor; and
a memory coupled to the processor which is configured to be capable of executing programmed instructions stored in the memory to:
transmit a cryptographic variable input to a detachably coupled smart card;
request execution of at least one of protected cryptographic algorithm operation by the smart card which requires the cryptographic variable input and a cryptographic constant input stored on the smart card to generate one or more cryptographic products, wherein the cryptographic variable input and the cryptographic constant input are different from a public key and a private key of a keypair used in an authentication of the smart card with the simulator computing device;
receive the one or more generated cryptographic products from the smart card;
generate an encrypted signal simulation based on execution of a simulator using the received one or more generated cryptographic products; and
output the generated encrypted signal simulation.

14. The device as set forth in claim 13 further comprising executable code which when executed by a processor causes the processor to:
determine acceptance of the cryptographic variable input by the smart card based on at least one rule;
wherein the request execution of at least one of protected cryptographic algorithm operation by the smart card is based on the determination indicating the acceptance of the cryptographic variable input.

15. The device as set forth in claim 13 further comprising executable code which when executed by a processor causes the processor to:
determine when the authentication to the smart card has been successfully completed based on a received personal identification number and based on cryptographic coupling of the smart card with the simulator computing device obtained by a signature verification process with the public key of the keypair with the smart card and the private key of the keypair with the simulator computing device;
wherein the transmit the cryptographic variable input is based on the determination of the successful authentication.

16. The device as set forth in claim 13 further comprising executable code which when executed by a processor causes the processor to:
determine from the smart card a number of remaining protected cryptographic algorithm operations on the smart card;
wherein the request execution of at least one of protected cryptographic algorithm operation by the smart card is based on the determination indicating at least one of the protected cryptographic algorithm operations is remaining.

17. The device as set forth in claim 13 further comprising executable code which when executed by a processor causes the processor to:
determine from the smart card when the requested at least one of the protected cryptographic algorithm operations was successfully executed;
wherein the receive the one or more generated cryptographic products from the smart card is based on the determination indicating the successful execution of the requested at least one of the protected cryptographic algorithm operations.

18. The device as set forth in claim 13 further comprising executable code which when executed by a processor causes the processor to:
authenticate a personal identification number associated with a user; and
receive the cryptographic variable input when the personal identification number associated with the user is authenticated.

* * * * *